(12) United States Patent
Agarwal

(10) Patent No.: US 8,775,304 B2
(45) Date of Patent: Jul. 8, 2014

(54) MONEY TRANSFER USING CELLULAR NETWORKS

(75) Inventor: Ashwini Kumar Agarwal, New Delhi (IN)

(73) Assignee: Alcatel Lucent, Paris (FR)

( * ) Notice: Subject to any disclaimer, the term of this patent is extended or adjusted under 35 U.S.C. 154(b) by 44 days.

(21) Appl. No.: 13/128,317

(22) PCT Filed: Sep. 8, 2009

(86) PCT No.: PCT/EP2009/061604
§ 371 (c)(1),
(2), (4) Date: Jun. 7, 2011

(87) PCT Pub. No.: WO2010/060661
PCT Pub. Date: Jun. 3, 2010

(65) Prior Publication Data
US 2011/0246360 A1  Oct. 6, 2011

(30) Foreign Application Priority Data

Nov. 25, 2008 (IN) .......................... 2922/CHE/2008

(51) Int. Cl.
*G06Q 20/28* (2012.01)
*G06Q 20/32* (2012.01)
*G06Q 20/20* (2012.01)

(52) U.S. Cl.
CPC ............... *G06Q 20/28* (2013.01); *G06Q 20/32* (2013.01); *G06Q 20/20* (2013.01)
USPC ............................................. 705/39; 705/66

(58) Field of Classification Search
CPC ..... G06Q 20/385; G06Q 20/04; G06Q 20/20; G06Q 40/02; G06Q 20/28; G06Q 20/32
See application file for complete search history.

(56) References Cited

U.S. PATENT DOCUMENTS

2006/0065717 A1* 3/2006 Hurwitz et al. ............... 235/381
2006/0069642 A1* 3/2006 Doran et al. .................... 705/39

(Continued)

FOREIGN PATENT DOCUMENTS

| WO | WO-0033264 A1 | 6/2000 |
| WO | WO-2007020394 A1 | 2/2007 |
| WO | WO-2008118855 A1 | 10/2008 |

OTHER PUBLICATIONS

Western Union; 4 pages ; Sep. 27, 2008; www.westernunion.tw/en/how_to_send.php.*

(Continued)

*Primary Examiner* — Ella Colbert
*Assistant Examiner* — Mary Gregg
(74) *Attorney, Agent, or Firm* — Harness, Dickey & Pierce, P.L.C.

(57) ABSTRACT

A method of transferring money from a first user to another user through a cellular network is disclosed. The method includes a the first user buying a voucher of a specified money from market and sending a USSD string to a cellular network, the cellular network authorizing details provided by the first user, sending a notification to the first user confirming transfer of the money to the second user, sending the second user a notification informing receipt of the money from the first user, sending the second user a secret code, a vendor confirming details provided by second user by contacting the cellular network, the cellular network further confirming the second user, authorizing the vendor to pay the specified money to the second user, crediting the money to the vendor account, and sending a confirmation to the first user notifying the second user has received the cash.

17 Claims, 4 Drawing Sheets

(56) References Cited

U.S. PATENT DOCUMENTS

| | | |
|---|---|---|
| 2007/0203836 A1 | 8/2007 | Dodin |
| 2007/0208618 A1* | 9/2007 | Paintin et al. ............. 705/14 |
| 2007/0299728 A1* | 12/2007 | Nemirofsky et al. ......... 705/14 |
| 2010/0114730 A1* | 5/2010 | Stahulak et al. ............. 705/26 |

OTHER PUBLICATIONS

Article Nick Hughes, Susie Lonie (XP002558500) cited in ISR, pp. 63-81, 2007.

International Search Report.

* cited by examiner

MONEY TRANSFER USING CELLULAR NETWORKS

BACKGROUND

1. Technical Field

The embodiments herein relate to monetary transaction systems and methods and more particularly, to electronic transferring of money via a third party.

2. Description of the Related Art

Many electronic cash payment systems and methods have been proposed to transfer money from one user to another. Each of these systems requires a complex series of transactions and verifications to ensure that the overall transaction occurs securely.

There also exist various agent-based money transfer services, such as those provided by Western Union, Money Gram, Cyber Cash and the like. Usually, these services involve a series of pre-transaction steps which are to be performed to establish a relationship with the intermediate agent. Also, establishing relationships with the intermediary is time consuming and requires submission of more documentation than many would prefer. The agent-based services require a payer to go to an agent's facility, have money transferred to a site near the payee, who then needs to approach the same transfer agent's site at the same location or another location to receive the money, which is a slow and often inconvenient arrangement.

Generally, the Electronic Fund Transfer (EFT) systems cannot satisfy the need for an automated transaction system that provides for the transfer of universally accepted economic value outside of the banking system. In case of money transactions using cellular communication devices, as in the case of "PayPal Mobile", the paying customer needs to register the mobile number with the agent site on internet and then transfer the money from the bank account to another customer's cellular communication device number, or email-id or the like. The second customer then needs to claim the received amount by registering on the agent site. The cellular device money transaction service necessitates the users to share bank account details with the agent site and also the transaction process is complicated. Further, implementation of this method requires attaining account information from all banks in a particular geographic area.

SUMMARY

In view of the foregoing, an embodiment herein provides a method of transferring money from a first user to a second user using a cellular network. The method comprises first user sending details to cellular network of the first user, the cellular network authorizing the details provided by the first user, cellular network sending a notification to the first user confirming transfer of the money to the second user, cellular network sending the second user a notification informing receipt of the money from the first user, cellular network sending the second user a secret code, a Vendor confirming details provided by the second user to the vendor by contacting the cellular network, the cellular network confirming the details of the second user provided by the vendor, cellular network authorizing the vendor to pay the money to the second user, cellular network sending a query to the second user for confirming receipt of the money, and crediting the money to account of the vendor, on the second user confirming the query. The first user sends the details to the cellular network using at least one of an Unstructured Supplementary Service Data (USSD) string, a Short Message Service (SMS) message or an Interactive Voice Response (IVR) menu. The details send by the first user to the cellular network comprises of an access code, number of a voucher obtained by the first user, and Mobile Station International ISDN number (MSISDN) of the second user. The first user sends the details in a string format *<access_code>*<voucher number>*<msisdn of second user>*# to the cellular network.

The cellular network authorizes the voucher number and MSISDN of the second user on reception of the details from the first user. The vendor confirms the second user by providing MSISDN of the second user and the secret code provided by the second user to the cellular network, wherein the vendor uses a format *<access_code>*<code>*<msisdn of second user>*# for confirming the second user. The vendor may also use an Interactive Voice Response (IVR) menu or a Short Message Service (SMS) message for confirming the second user by providing MSISDN of the second user and the secret code provided by second user to the cellular network. The cellular network marks the voucher number as transferred on crediting the money to account of the vendor and sends a confirmation that second user has received the money to the first user on the second user confirming receipt of the money.

Embodiments herein further disclose a Home Location Register (HLR) in a network comprising at least one means adapted for receiving details from a first user transferring money to a second user, sending a notification to the first user confirming transfer of money to the second user, sending the second user a notification informing receipt of the money from the first user, receiving a secret code from the second user, confirming the second user by verifying details provided by the vendor, sending a query to the second user for confirming receipt of the money, and crediting the money to account of the vendor on the second user confirming the query. The cellular network comprises at least one means adapted for sending a notification to the vendor on completion of transfer of the money to the second user.

Embodiments herein further disclose a Service Control Point (SCP) in a cellular network comprising atleast one means adapted for authorizing details of the second user provided by the first user, sending a notification to the first user 101 indicating that money would be transferred to the second user, authorizing the vendor to pay the money to the second user, sending a notification message and a secret code to the second user informing about the reception of money from the first user.

These and other aspects of the embodiments herein will be better appreciated and understood when considered in conjunction with the following description and the accompanying drawings.

BRIEF DESCRIPTION OF THE DRAWINGS

The embodiments herein will be better understood from the following detailed description with reference to the drawings, in which.

DETAILED DESCRIPTION OF EMBODIMENTS

Figure 1:
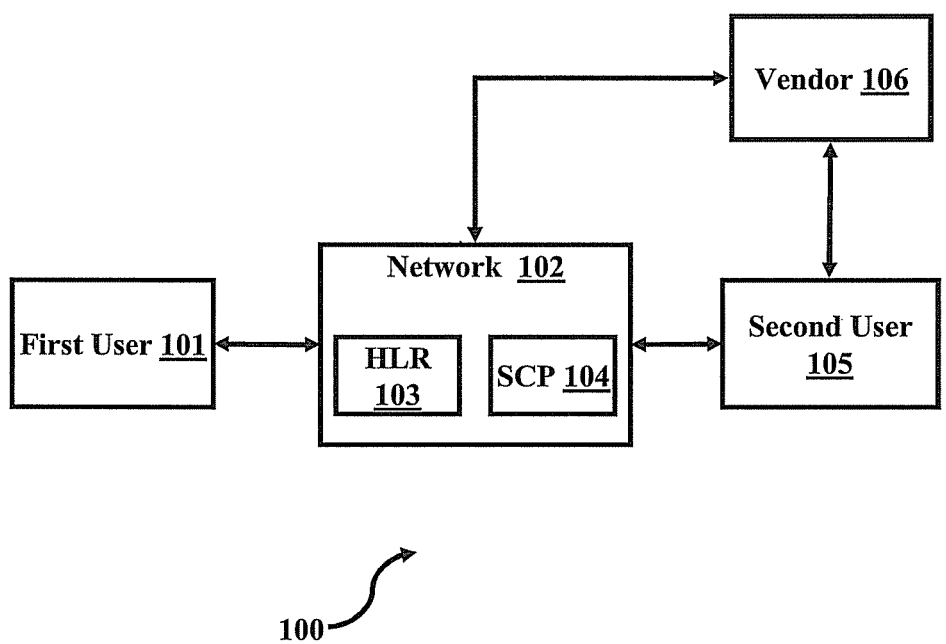
FIG. 1 is a block diagram illustrating the elements involved in electronic transferring of money from one user to another user in a cellular communication network, in accordance with the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a method for transferring money from one user to another user using a cellular communication device through a cellular communication network. Referring now to the drawings, and more particularly to FIGS. 1 through 4, where similar reference characters denote corresponding features consistently throughout the figures, there are shown embodiments.

The embodiment herein discloses a method of electronically transferring a specified monetary value instantaneously from one user to another user through a cellular network. A user that needs to transfer money, hereinafter referred to as first user, buys a prepaid voucher of specified monetary value from the market and sends an Unstructured Supplementary Service Data (USSD) string containing the voucher number and Mobile Station International ISDN number (MSISDN) of another user to Home Location Register (HLR) of a cellular network. The Service Control Point (SCP) of cellular network authorizes the details provided by the first user and sends a notification along with a secret code to the recipient of the money as desired by the first user, hereinafter referred to as the second user. The notification sent by SCP to the second user informs the second user about the reception of money from the first user. The second user then provides the secret code to a vendor who sends a message with the secret code and MSISDN of second user to the SCP of a cellular network through a HLR. SCP then confirms the second user and authorizes the vendor to pay the money to the second user. The network then transfers the money to the account of the vendor, on confirming the reception of money by the second user. Further, the network marks the voucher number as transferred and notifies the first user that the second user has received the money.

FIG. 1 is a block diagram illustrating the elements involved in electronic transferring of money from one user to another user in a cellular communication network, in accordance with the embodiments herein. The first user 101 buys a voucher of a specified monetary value that is to be sent to the second user 105. The vouchers are available as prepaid vouchers, for instance prepaid vouchers for mobile phones, landline Prepaid Cards such as India Telephone (IT) Cards, Callow Cards, Foreign Language Proficiency Pay (FLPP) Recharge Coupons and the like, in the market. The first user 101 then sends an Unstructured Supplementary Services Data (USSD) string to HLR 103 of the cellular network 102 of the first user 101. The USSD string sent by the first user 101 to the HLR 103 comprises the fields of an access code, the number of the voucher purchased by the first user 101 and the MSISDN of the second user 105. For instance, the first user 101 usually sends the details in a string format *<access_code>*<voucher number>*<msisdn of second user># to the cellular network 102. Service Control Point (SCP) 104 of the cellular network 102 authorizes the voucher number and MSISDN of the second user 105. The SCP 104 then indicates the voucher number as used. Further, the SCP 104 sends a notification to the first user 101 indicating that the money would be transferred to second user 105. The SCP 104 also sends a notification message to the second user 105 informing about the reception of money from the first user 101 accompanied by a secret code. The second user 105 approaches a vendor 106 and provides the secret code to the vendor 106. The vendor 106 sends a message to the SCP 104 of the cellular network 102, where the message comprises fields of access code of the vendor, the secret code given by the second user 105 and the MSISDN of the second user 105. For instance, the vendor 106 uses a format *<access_code>*<code>*<msisdn of second user># for confirming the second user 105 with the cellular network 102. The SCP 104 authorizes the secret code and MSISDN of the second user 105 and sends an authorization message to the vendor 106 to pay the specified amount to the second user 105. The second user 105 receives an USSD notification from SCP 104 querying the reception of the money. The second user 105 sends a confirmation to SCP 105 on receiving the money from the vendor. SCP then marks the voucher number as transferred and credits the money to the mobile account of the vendor 106. Further, the first user 101 receives a notification informing that the money has been transferred to the second user 105 and vendor 106 receives a notification that the transaction is complete.

Figure 2:
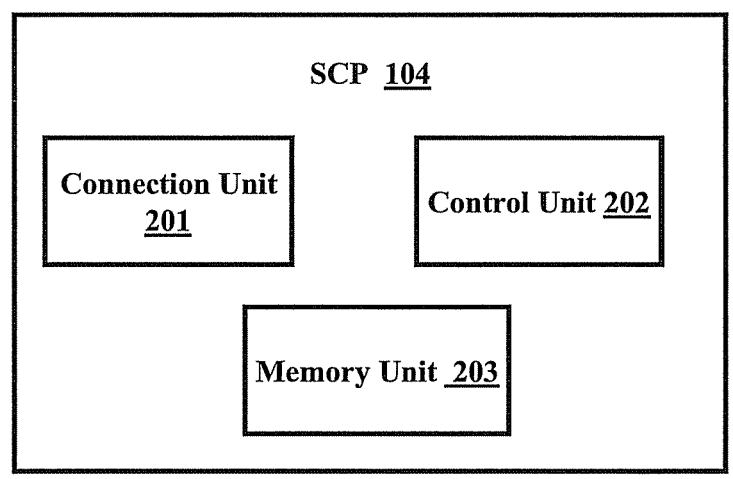
FIG. 2 is a block diagram illustrating an example Service Control Point (SCP), in accordance with the embodiments herein.
Figure 2:

FIG. 2 is a block diagram illustrating an exemplary Service Control Point (SCP), in accordance with the embodiments herein. The SCP 104 includes a connection unit 201, a control unit 202 and a memory unit 203. The control unit 202 is a processor or a group of processors executing the instructions of the operating system stored in the memory unit 203. The USSD service, present in the control unit 203 of the SCP 104, implements the money transfer service. USSD service is mostly used to query the available account balance and other similar information in cellular networks. USSD is a session oriented service and the users can enter the Unstructured Supplementary Services Data (USSD) command direct from the cellular phone screen. The memory units 203 comprise of a hard disk or RAM modules to store, for example, voucher details provided by the first user 101, vendor 106 details, user accounts, program code sequences executed by the control unit 202 and the like. Control unit 202 also influences the functions of connection unit 201 in establishing connection between the first user 101, the second user 105 and the vendor 106.

Figure 3:
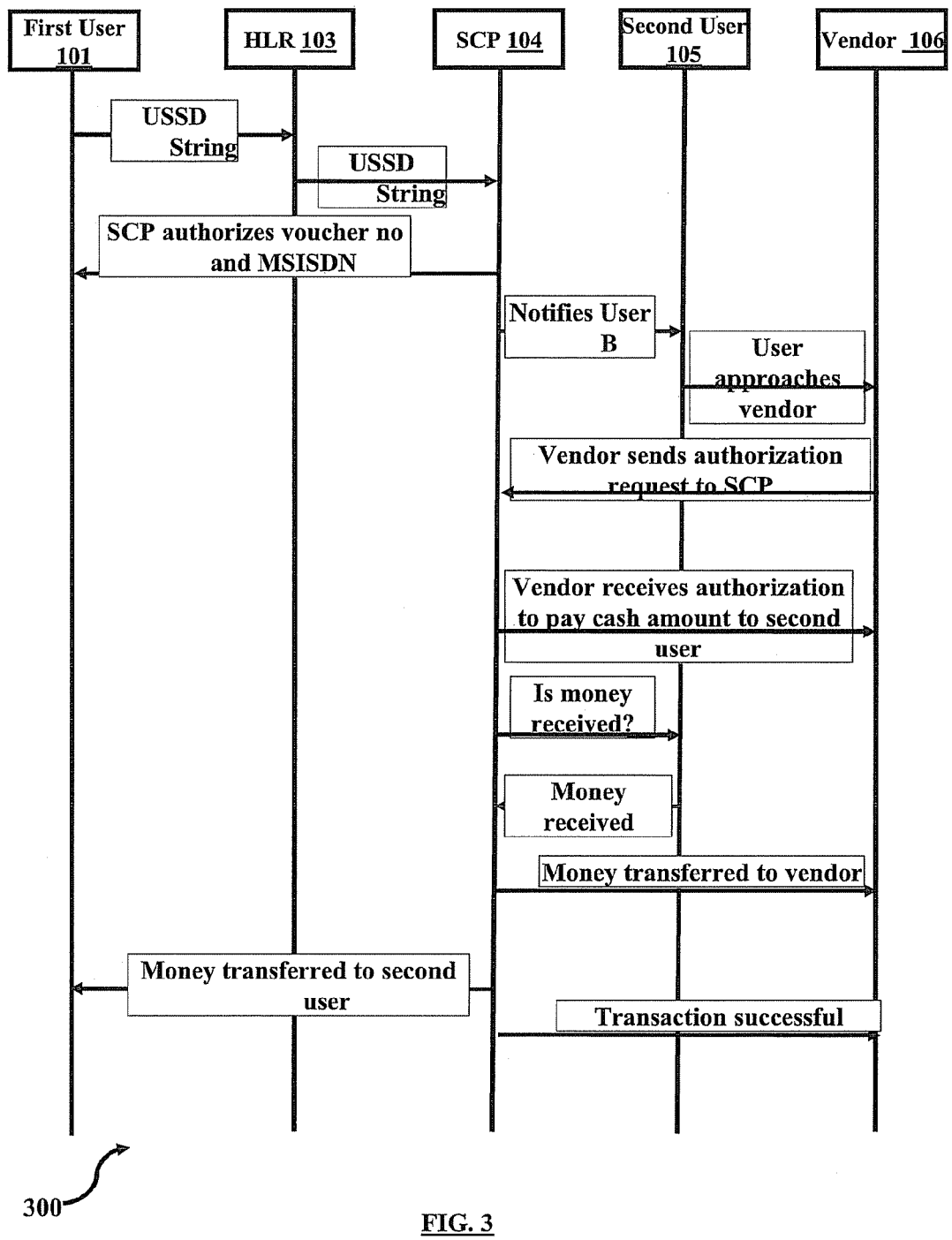
FIG. 3 is a schematic diagram illustrating the call flow for transfer of money from one user to another user in a cellular communication network, in accordance with the embodiments herein.

FIG. 3 is a schematic diagram illustrating the call flow for transfer of money from one user to another user in a cellular communication network, in accordance with the embodiments herein. The first user 101 buys a voucher of a specified monetary value to be transferred to the second user 105 from the market. The first user 101 then sends a USSD string to HLR 103 of the cellular network 102. The USSD string sent by the first user 101 to the HLR 103 comprises the fields of an access code, the number of the voucher purchased by the first user 101 and the MSISDN of the second user 105. For instance, the first user 101 usually sends the details in a string format *<access_code>*<voucher number>*<msisdn of second user># to the cellular network 102. The HLR 103 then transmits the USSD string to the Service Control Point (SCP) 104 of the cellular network 102. The SCP 104 of the cellular network 102 authorizes the voucher number and MSISDN of the second user 105 and marks the voucher number as used. Further, the SCP 104 sends a notification to the first user 101 indicating that money would be transferred to the second user 105. The SCP 104 then sends a notification message and a secret code to the second user 105 informing about the reception of money from the first user 101. The second user 105 approaches a vendor 106 and provides the secret code received from the SCP 104 to the vendor 106. The vendor 106 sends a message to the SCP 104 of the cellular network, where the message comprises the fields of access code of the vendor, the secret code given by the second user 105 and the MSISDN of the second user 105. The vendor 106 uses a format *<access_code>*<code>*<msisdn of second user># for confirming for confirming the second user 105 with the cellular network 102 as instanced. The SCP 104 authorizes the secret code and MSISDN of the second user 105 and sends an authorization message to the vendor 106 to pay the specified amount to the second user 105. The second user 105 receives an USSD notification from SCP 104 querying the reception of the money. The second user 105 sends a "Yes" to SCP 105 on receiving the money from the vendor. SCP then marks the voucher number as transferred and credits the money to the mobile account of the vendor 106. Further, the first user 101 receives a notification informing that the money has been transferred to the second user 105 and vendor 106 receives a notification that the transaction is complete. The commission structure involved in the money transfer includes a vendor selling the voucher to the first user 101, the vendor 106 paying the money to the second user 105 and the operators of the cellular network.

Figure 4:
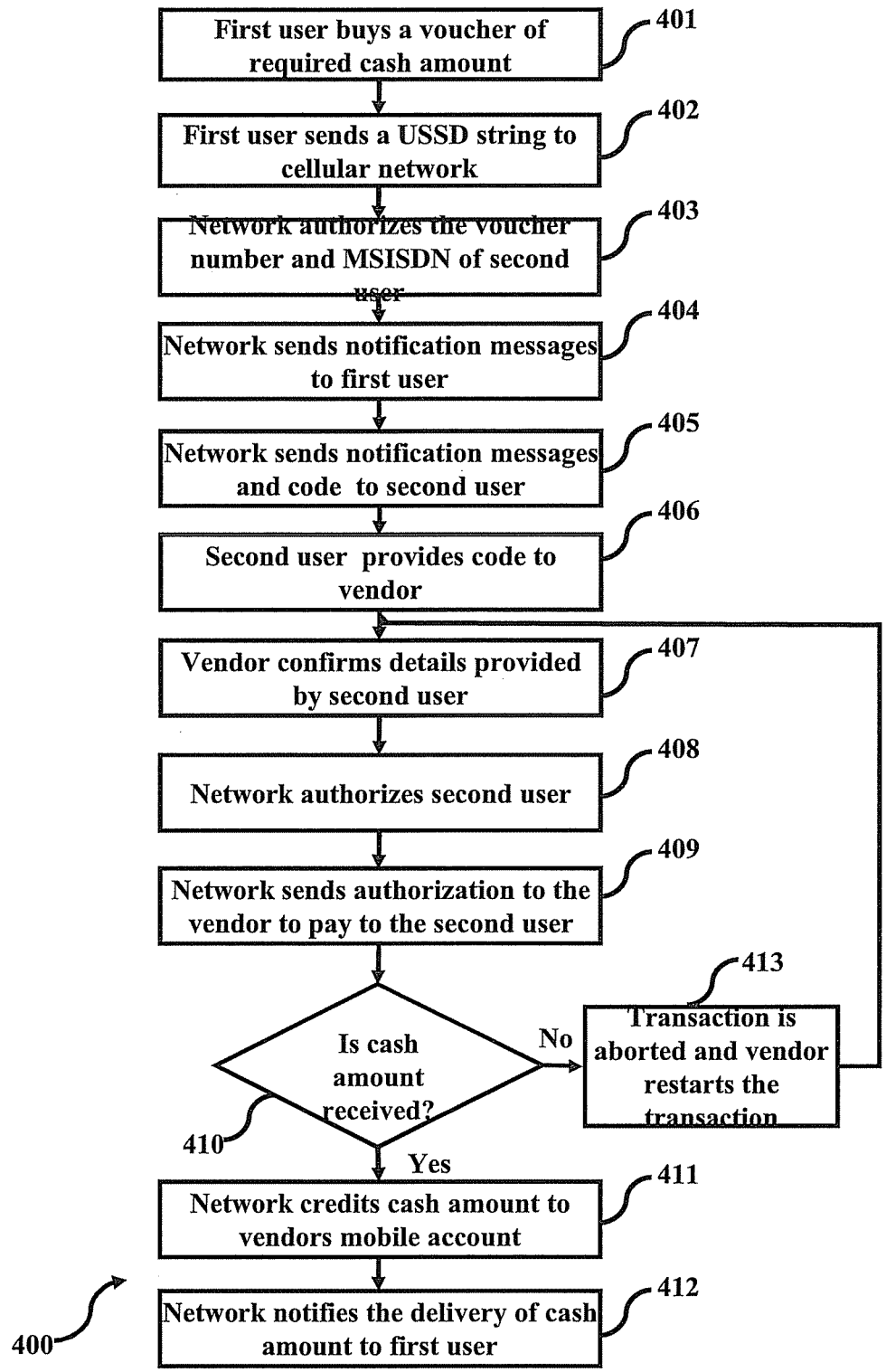
FIG. 4 is a flowchart illustrating a method of transferring money electronically from one user to another user in a cellular communication network, in accordance with the embodiments herein.

FIG. 4 illustrates a flowchart depicting a method of transferring money electronically from one user to another user in a cellular communication network, in accordance with the embodiments herein. The first user 101 buys (401) a voucher of required monetary value to be transferred to the second user 105 from a vendor. The first user 101 then sends (402) a USSD string to HLR 103 of the cellular network 102 of the first user 101. The USSD string sent by the first user 101 to the HLR 103 comprises the fields of an access code, the number of the voucher purchased by the first user 101 and the MSISDN of the second user 105. The first user 101 sends the details in a string format *<access_code>*<voucher number>*<msisdn of second user># to the cellular network 102. The Service Control Point (SCP) 104 of the cellular network 102 authorizes (403) the voucher number and MSISDN of the second user 105. The SCP 104 then marks the voucher number as used. Further, the SCP 104 sends (404) a notification to the first user 101 indicating that money would be transferred to the second user 105. The SCP 104 also sends (405) a notification message to the second user 105 informing the reception of money from the first user 101 and a secret code. The second user 105 approaches a vendor 106 and provides (406) the secret code to the vendor 106. The vendor 106 confirms (407) the second user 105 by sending a message to the SCP 104 of the cellular network, where the message comprises the fields of access code of the vendor, the secret code given by the second user 105 and the MSISDN of the second user 105. The vendor 106, for instance, uses a format *<access_code>*<code>*<msisdn of second user># for confirming the second user 105 with the cellular network 102. The SCP 104 authorizes (408) the secret code and MSISDN of the second user 105 and sends (409) an authorization message to the vendor 106 to pay the specified amount to the second user 105. The network 102 then checks (410) with the second user 105 to check if the amount has been received by the second user 105. If the money is paid to the second user 105 and the second user 105 confirms the reception of the money by sending a "Yes" as a reply to the network 102 query, the network 102 credits (411) the money to mobile account of the vendor 106. Further, the network 102 notifies (412) the first user 101 that the money has been transferred to the second user and the vendor 106 receives a notification that the transaction is complete. If the query on reception of money is not confirmed by the second user 105, the network 102 aborts (413) the money transaction to vendor account and the vendor need to restart the transaction. The various actions in method 400 may be performed in the order presented, in a different order or simultaneously. Further, in some embodiments, some actions listed in FIG. 4 may be omitted.

The embodiment disclosed herein, where the first user 101 sends information to the HLR of the cellular network regarding the voucher information and the identity of the second user 105, may alternately involve the first user 101 using an Interactive Voice Response (IVR) to communicate to the network the voucher number and the MSISDN of the second user 105.

The embodiment disclosed herein, where the first user 101 sends information to the HLR of the cellular network regarding the voucher information and the identity of the second user 105, may alternately involve the first user 101 using a Short Message Service (SMS) message to communicate to the network the voucher number and the MSISDN of the second user 105.

The embodiment disclosed herein, where the vendor 106 sends information to the HLR of the cellular network for confirming the identity of the second user 105, may alternately involve the vendor 106 using an Interactive Voice Response (IVR) to communicate to the network the access code of the vendor 106, the secret code as provided by the second user 105 and the MSISDN of the second user 105.

The embodiment disclosed herein, where the vendor 106 sends information to the HLR of the cellular network for confirming the identity of the second user 105, may alternately involve the vendor 106 using a Short Message Service (SMS) message to communicate to the network the access code of the vendor 106, the secret code as provided by the second user 105 and the MSISDN of the second user 105.

The embodiment disclosed herein can be integrated with the Intelligent Network (IN) products. The embodiment herein permits the money to be transferred from one user to another without necessitating the sender or receiver to have a bank account, facilitates immediate money transfer to other users, does not require internet connectivity, no need to register the mobile numbers with the network to transfer the money, and the service is in active mode even when the subscriber is in roaming condition.

The embodiments disclosed herein can be implemented through at least one software program running on at least one hardware device and performing network management functions to control the network elements. The network elements shown in FIG. 1 include blocks which can be at least one of a hardware device, a software module or a combination of hardware device and software module.

The embodiment disclosed herein specifies that the money transfer service can be hosted as a separate entity or in combination with the already existing elements of the network. Therefore, it is understood that the scope of the protection is extended to such a program and in addition to a computer readable means having a message therein, such computer readable storage means contain program code means for implementation of one or more steps of the method, when the program runs on a SCP or any suitable programmable device. The method is implemented in a preferred embodiment through or together with a software program written in e.g.

Very high speed integrated circuit Hardware Description Language (VHDL) or C, C++, Java, or using another programming language, or implemented by one or more VHDL, C, C++, or Java processes or routines, or several software modules being executed on at least one hardware device. The hardware device can be any kind of device which can be programmed including e.g. any kind of computer like a server or a personal computer, an FPGA, a processor, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the invention may be implemented on different hardware devices, e.g. using a plurality of CPUs.

What is claimed is:

1. A method of overseeing a money transfer from a first user to a second user using a cellular network, said method comprising:
   receiving money transfer information at the cellular network, from said first user, the money transfer information including an electronic transfer of an amount of a money to the cellular network;
   verifying, at said cellular network, said information provided by said first user;
   sending from the cellular network to said second user a notification informing receipt of said money from said first user;
   sending from the cellular network to said second user a secret code;
   sending from the cellular network to a vendor an authorization message indicating the amount of the money received from said first user, when the cellular network receives the secret code from the vendor; and
   crediting the amount of the money to an account of said vendor, when said second user provides the cellular network with confirmation that said vender paid the amount of the money to said second user.

2. The method as claimed in claim 1, wherein said cellular network is configured to receive the money transfer information using an Unstructured Supplementary Service Data (USSD) string.

3. The method as claimed in claim 1, wherein the money transfer information includes,
   an access code;
   number of a voucher, said voucher obtained by said first user; and
   Mobile Station International ISDN number (MSISDN) of said second user.

4. The method as claimed in claim 1, wherein said money transfer information is in a string format *<access_code>*<voucher number>*<msisdn of second user>#.

5. The method as claimed in claim 1, wherein said money transfer information is sent to said cellular network using an Interactive Voice Response (IVR) menu.

6. The method as claimed in claim 1, wherein said information is sent to said cellular network using a Short Message Service (SMS) message.

7. The method as claimed in claim 3, wherein said cellular network authorizes the number of the voucher number and MSISDN of said second user upon receiving said money transfer information from said first user.

8. The method as claimed in claim 1, wherein the cellular network is configured to confirm said second user to the vender, when the vender provides a MSISDN of said second user and said secret code to said cellular network.

9. The method as claimed in claim 8, wherein said vendor uses a format *<access_code>*<code>*<msisdn of second user>#  for confirming said second user.

10. The method as claimed in claim 8, wherein said MSISDN of said second user and said secret code is provided by said second user to said cellular network using an Interactive Voice Response (IVR) menu.

11. The method as claimed in claim 1, wherein said vendor uses a Short Message Service (SMS) message for confirming said second user by providing MSISDN of said second user and said secret code provided by said second user to said cellular network.

12. The method as claimed in claim 3, wherein said cellular network marks the number of the voucher as transferred on crediting said money to account of said vendor.

13. The method as claimed in claim 1, wherein said cellular network sends a confirmation to said first user on said second user confirming receipt of said money.

14. A network element configured to oversee a money transfer, the network element comprising:
   a service control point that includes a processor, the processor configured to,
     receive money transfer information from a first user, the money transfer information instructing the network element to perform the money transfer to a second user;
     send said second user a notification informing receipt of said money transfer information from said first user;
     confirm said second user by verifying the information provided by a vendor;
     send a query to said second user, the query asking the second user to confirm receipt of an amount of money equal to an amount of money indicated in the money transfer information; and
     credit the amount of money to an account of said vendor on said second user confirming said query.

15. The network element of claim 14, wherein said service control point is configured to send a notification to said vendor upon crediting the amount of money to the account of said vendor.

16. The network element of claim 14, wherein the processor is further configured to,
   send a notification to the first user indicating that the amount of money would be transferred to the second user;
   authorize information of said second user provided by said first user;
   send a notification message and a secret code to the second user, the secret code including informing about the reception of money from the first user; and
   authorize a vendor to pay said money to said second user, when the network element receives the secret code from the vendor.

17. A method of overseeing an electronic transfer of funds using a cellular network, said method comprising:
   sending, electronically from the cellular network, a mobile terminal a secret code, when the cellular network has received funds that are addressed to the mobile terminal;
   receiving, electronically at the cellular network the secret code from a vender, the secret code being a same secret code as the secret code sent to the mobile terminal;

sending, electronically from the cellular network, the vendor an authorization message indicating an amount of the received funds that are addressed to the mobile terminal, when the cellular network receives the secret code from the vendor; and crediting, electronically from the cellular network, an account of the vendor by the amount, when the cellular network receives from the mobile terminal a confirmation, the confirmation indicating whether the vendor has given the amount of the received funds that are addressed to the mobile terminal to a user of the mobile terminal.

\* \* \* \* \*